Patented Jan. 10, 1939

2,143,004

UNITED STATES PATENT OFFICE 2,143,004

CAST CONCRETE ARTICLE HAVING A GLOSSY SURFACE RESISTANT TO WATER SPOTTING, AND METHOD OF MAKING

Oswald H. Greager and Gordon D. Patterson, Wilmington, Del., assignors, by mesne assignments, to E. I. du Pont de Nemours & Company, Wilmington, Del., a corporation of Delaware No Drawing. Application June 18, 1936, Serial No. 86,024

8 Claims. (Cl. 25—154)

This invention relates to concrete masses for structural and decorative purposes, and more particularly to cast concrete articles for glossy surfaces.

This invention has as an object the preparation of cast concrete articles having an integrally glazed surface resistant to disfiguring by contact with water and also resistant to the effect of weather. Other objects will appear hereinafter.

These objects are accomplished by the following invention wherein a concrete mix is prepared containing a small amount of a deflocculating agent, the mix cast in contact with a glossy polished surface, and the glossy surface thus obtained fixed by treating the glossy surface with a solution of a fluosilicate of a metal of Family B of Group II of the Periodic System, i. e., magnesium, cadmium, or zinc, an alkali fluosilicate, i. e. a fluosilicate of sodium, ammonium, lithium, potassium or an iron group metal fluosilicate, i. e. a fluosilicate of iron, cobalt or nickel, or a fluosilicate of copper.

Having thus outlined the principles and purposes of the invention, the following exemplifications thereof are added in illustration and not in limitation.

Example I

A dry mix was first prepared as follows:

| | Parts by weight |
|---|---|
| Portland cement | 100 |
| Sand (20 mesh) | 100 |
| Toluidine toner | 15 |

Two and fifteen hundredths parts of deflocculating agent consisting of 75% glue and 25% sodium isopropylnaphthalenesulfonate and 25 parts of water were thoroughly mixed with the above dry cement composition. The mix was then placed in a polished sheet iron mold to a depth of ¼″ which was backed by 1½″ of ordinary concrete. The mix was then aged for 6 days in a moist atmosphere at room temperature.

The cured concrete was then stripped from the mold and allowed to dry for 4 hours at room temperature and 40% relative humidity. The concrete slab was then placed in a 2% solution of magnesium fluosilicate for 30 minutes, agitating the solution occasionally.

The treated glazed slab was then removed from the fluosilicate bath, rinsed with water and allowed to dry in air. A red colored concrete slab was obtained which had a mirror-like surface and which showed no permanent marking after water was dropped on it and allowed to evaporate.

This product after having beeen washed twice a week with soap and water during twelve months' indoor exposure showed excellent retention of gloss and color with excellent resistance to cracking and water spotting.

Example II

The following materials were dry mixed:

| | Parts by weight |
|---|---|
| Portland cement | 100 |
| Ceramic green pigment comprising intercombined oxides of aluminum, zinc, cobalt and chromium | 15 |

To this was added 1.7 parts of deflocculating agent consisting of 75% glue and 25% sodium isopropylnaphthalenesulfonate. 25 parts of water were added and the mix worked to give the proper consistency. This was then placed in enameled molds to a depth of ⅜″ and aged for 6 days in a moist atmosphere at room temperature.

The cured green concrete slab was stripped and allowed to dry for 4 hours at room temperature and 40% humidity. It was then placed for 10 minutes in a 20% solution of magnesium fluosilicate, removed, washed with water, and allowed to dry in air.

This product showed excellent retention of gloss and color and resistance to water spotting after several months' outdoor exposure; indoors the product remained in excellent condition after having been washed twice a week with soap and water for twelve months.

In place of the magnesium fluosilicate of the above examples, there may be used solutions of cadmium fluosilicate or zinc fluosilicate.

Example III

The following materials were mixed dry:

| | Parts by weight |
|---|---|
| White Portland cement | 100 |
| White marble chips | 350 |
| Ultramarine blue | 18 |

Four and seven tenths parts of the deflocculating agent consisting of triethanolamine linoleate dissolved in 50 parts of water were added and the mix worked with additional water to proper consistency.

The mix was placed in an enameled mold to a depth of ½″ and aged for 3 days at room temperature. The cured concrete was then stripped from the mold, allowed to dry for 4 hours at room temperature and placed for 30 minutes in a 10% solution of ammonium fluosilicate.

The blue concrete slab was then washed and allowed to dry in the air.

The product showed excellent gloss and resistance to water spotting.

Example IV

The following materials were mixed dry:

| | Parts by weight |
|---|---|
| Portland cement | 100 |
| Haydite aggregate | 250 |
| Iron oxide (black) | 9 |

Four and five tenths parts of deflocculating agent consisting of sodium caseinate (other alkali soluble protein may be used also) dissolved in 50 parts of water were added and the mix worked with additional water to proper consistency. This was then placed in a glass mold to a depth of ½" and aged 3 days in a moist atmosphere at room temperature.

The cured black concrete slab was stripped and allowed to dry for two hours at room temperature and humidity. It was then placed for twenty minutes in a saturated solution of sodium fluosilicate, the glazed strip removed, washed with water, and allowed to dry in air.

The product showed excellent gloss and resistance to water spotting.

The sodium and ammonium fluosilicates of the above examples may be replaced by potassium, lithium or cupric fluosilicates.

Example V

The following materials were mixed dry:

| | Parts by weight |
|---|---|
| Portland cement | 100 |
| Sand | 100 |
| French ochre | 4 |

Two parts of deflocculating agent consisting of the sodium salt of sulfonated vegetable oil dissolved in 20 parts of water were added and the mix worked with additional water to proper consistency. This was then placed in an enameled mold to a depth of ⅜" and aged for 6 days in a moist atmosphere at room temperature.

The cured buff-colored concrete slab was stripped and allowed to dry for three hours at room temperature and humidity. It was then placed for 20 minutes in a 10% solution of cobaltous fluosilicate, the glazed strip removed, washed with water and allowed to dry in air.

The product showed excellent gloss and resistance to water spotting. The cobalt fluosilicate of the above example may be replaced by nickelous or ferrous fluosilicates.

The constituents and conditions given above may be varied to a considerable extent without departing from the scope of this invention. For example, the quick-setting or "24-hour" cement of commerce may be used in place of ordinary Portland cement, and a correspondingly shorter molding period obtained. Other colors, aggregates and glossing agents may also be used, as indicated below.

In the process of the present invention a deflocculating agent is employed in the concrete mix. In addition to the glue: sodiumisopropylnaphthalenesulfonate, triethanolamine linoleate, sodium caseinate, etc. disclosed in the above examples, other cement deflocculating agents may be employed either singly or in combination. A variety of cement deflocculating agents are useful including sulfated oleylacetate, sodium salts of highly sulfonated fatty acid amides, sulfonated linseed oil, deacetylated chitin acetate, diethylcyclohexylamine dodecylsulfate, N-octadecylbetaine, trimethyloctadecylammonium bromide, cetylpyridinium bromide and particularly sulfonates of substituted naphthalenes containing alkyl or other hydrocarbon radicals of at least three carbon atoms, such as propyl, benzyl, butyl, naphthalene mono- and polysulfonates, water soluble resinates, fatty acid soaps, sulfates and sulfonates of long chain aliphatic alcohols, and derivatives, such as esters and ethers, of sulfated long chain aliphatic alcohols, alkali soluble caseins and glues, etc.

Deflocculating agents have also been incorporated in cement mixes to improve their workability and fluidity, and the same agents as heretofore used for such purposes are also effective in the preparation of the present invention for casting glossy, resistant surfaces.

Such deflocculating agents are usually of the type of compounds which contain polar groups, and which have the properties of altering the interfacial forces in solid-liquid systems.

In producing our novel glazed concrete masses, we incorporate into the cement mix the usual fine aggregates such as sand, etc. and there is no limitation in respect to our invention as to the type of materials or its size. A wide variety of aggregates may be used in the process. Sand at 8, 20, 40 and 60 mesh, ground marble or other stone, and cellular aggregates such as the commercial Haydite give satisfactory results. The aggregate, of course, must be resistant to the alkalinity of the cement mixes.

The colors used in the cement mixes should preferably be stable therein and, for out-door exposure, resistant to light. The colors may be treated for dispersion control, e. g. with a deflocculating agent in which case a smaller amount of cement deflocculating agent or even in some cases none may be employed.

In addition to the colors above-named, cement colors in general may be employed including titanium white, lithopone, yellow, red and dark ochres, ultramarine violet, blue, and green, siennas, umbers, ferrite yellow, Naples yellow, artificial iron oxide brown, cobalt blue, Guignet's green, manganese and iron oxide blacks. Toners such as toluidine toner (m-nitro-p-toluidine plus beta-naphthol) are satisfactory from the coloring standpoint but are not desirable for out-door exposure because of their light sensitivity.

The invention is not limited to the production of colored concretes, but the process may be employed in the production of grey concrete compositions. It is, however, particularly useful in the production of colored concretes.

No particular or specific requirement as to the water content of the cement mixtures is necessary to the process of the present invention. It is, of course, necessary that sufficient fluidity be present in the mix to insure good flow into the mold surface. This fluidity can be obtained over quite a range of water content and even very stiff mixes can be placed in the molds with the aid of mechanical vibrators.

Once the desired deflocculating cement mix has been prepared, it is placed in the necessary mold. These molds can be constructed of any material which can be polished to a smooth surface and which is not attacked by cement mixes. Sheet iron, enameled iron, synthetic resin coated, stainless steel, chromium plate, porcelain, and glass lined molds have all been used successfully.

The time of curing in the mold depends upon the type of cement used. It is necessary that the time of curing be sufficient to allow setting of the cement or concrete so that the concrete masses can be stripped from the molds without injuring the glossy surfaces. When stripped prematurely, the cast objects do not part cleanly from the molds and the glossy surface is destroyed; if stripping is delayed too long, excessive shrinkage occurs and permits water to condense between the mold and concrete surface causing water spotting and disfiguration. According to our experience with Portland cement at room temperature, fourteen days represents the maximum, three the minimum, and six the optimum molding period; and six or seven days the maximum, one the minimum and three the optimum with quick-setting cement. Inasmuch as the temperature, humidity and ingredients chosen cause the curing time to vary within rather wide limits, the time at which the cement object is stripped from the molds will also vary considerably. Elevation of temperature in general accelerates the curing.

It is necessary that the concrete dry sufficiently before impregnation to permit penetration of the solution but too long a period renders the fixing treatment less effective and even ineffectual. While the limits depend upon the condition of temperature and humidity, it has been found in general that a drying time of less than one hour at room temperature is unsatisfactory while drying periods greater than one day are likewise ordinarily undesirable, although under some conditions drying times greater than one day may be employed. Very practical results have been obtained under ordinary atmospheric conditions by a drying period of four hours at 20° C. and 40% relative humidity.

The glossy surface obtained on drying is exceedingly sensitive and readily loses its gloss by standing in a moist atmosphere. It is particularly sensitive to liquid water and a single drop of water leaves a spot where the gloss can not be restored on drying and even polishing. We have, however, found that this gloss can be fixed and rendered resistant by treatment with aqueous solutions of certain fluosilicates.

The action of the fluosilicates is very specific and only certain fluosilicates were found to have this fixing effect. In the process of the present invention, there is employed a fluosilicate of the bivalent metals of the B family of the second group of the Periodic System, namely, magnesium, zinc and cadmium, or a fluosilicate of ammonium, copper or an alkali metal, e. g. sodium, lithium or potassium, or a metal of the iron group, i. e., iron, cobalt or nickel.

The specific effect of the fluosilicates of the present invention upon the glossy surface obtained according to the preceding steps of our process is entirely different from the well known effect of magnesium or aluminum fluosilicates upon rough concrete to render such concrete masses impermeable to liquids. Thus aluminum fluosilicate which is well known for its impermeabilizing effect on concrete is absolutely worthless as a fixing agent for glossy concrete surfaces. A solution of aluminum fluosilicate brought into contact with the novel glossy surfaces before fixation immediately destroys their luster and leaves a white spot on the surface as does water.

The concentration and time of contact of the glossy concrete with the fluosilicate solutions of the present invention is not very critical. Various concentration and immersion times have been found satisfactory and the time of immersion depends to some extent upon the concentration. The treatment is effective at concentrations even up to that of a saturated solution. Immersion time has been found satisfactory from 5 minutes up to one hour or more, the longer time required corresponding to the more dilute solutions. The treatment is easily effected by dipping the stripped and partly dried concrete cement object in a solution of fluosilicate or by brushing or spraying such a solution on the glazed surface. After the objects have been in contact with the fluosilicate for the desired length of time, they may be rinsed with water to remove excess solution and may be wiped dry.

For reasons of cost and strength it is preferable that the glaze producing mix be backed with some other material which may be, for example fresh or already set ordinary concrete, porous concrete or brick. The concrete can, of course, be backed with any other satisfactory building material.

The glazed concrete masses of our invention are useful for both interior and exterior finishing purposes, for stair railings, baseboards, trim and fixtures and also for more strictly ornamental purposes such as statuary, plaques, markers, lamp bases, etc. In the construction field, particularly, a hard, stone-like, glossy material produced by the process of the present invention is excellently suited for use as bathroom tile and in other applications wherein washable, mar-resistant surfaces are required.

The concrete and cement objects obtained by the process of the present invention have integrally glazed, mirror-like surfaces resistant to disfiguration by contact with liquid water and also resistant to out-door weathering. These are produced at a considerably lesser cost than fired ceramic glazes. If compared with previous attempts to produce a glossy concrete of general usefulness, the products of this invention are characterized by complete water-resistance instead of only very slight resistance to water spotting, and further enjoy the advantage of excellent out-door durability. In actual tests, these products have maintained an attractive glossy surface over extended exposure periods, whereas it is well known that cement products fail by loss of color and cracking under the same conditions.

The above description and examples are intended to be illustrative only. Any modification of or variation therefrom which conforms to the spirit of the invention is intended to be included within the scope of the claims.

We claim:

1. A process for producing cast concrete having a glossy surface resistant to water spotting which comprises casting a deflocculated, colored, Portland cement concrete mix in a mold having a smooth surface, curing and drying the same, and treating said surface with a magnesium fluosilicate solution.

2. A process for producing cast Portland cement concrete having a glossy surface resistant to water spotting which comprises casting a deflocculated colored Portland cement concrete mix in a mold having a smooth surface, curing the same for a predetermined time sufficient to allow setting of the cement so as to permit the concrete object to be stripped from the mold without injuring the glossy surface but insufficient to allow shrinkage of the concrete and condensation of moisture between the concrete and the mold, drying the concrete for from one to twenty-four hours and treating the surface of said concrete with a solution of a fluosilicate selected from the class consisting of magnesium, cadmium and zinc.

3. A process for producing cast concrete having a glossy surface resistant to water spotting which comprises casting a deflocculated, colored, Portland cement concrete mix in a mold having a smooth surface, curing and drying the same, and treating said surface with a solution of a fluosilicate selected from the class consisting of magnesium, cadmium and zinc.

4. A process for producing cast concrete having a glossy surface resistant to water spotting which comprises casting a defluocculated, Portland cement concrete mix in a mold having a smooth surface, curing the same, drying for 1 to 24 hours, and treating said surface with a magnesium fluosilicate solution.

5. A process for producing cast concrete having a glossy surface resistant to water spotting which comprises casting a deflocculated, Portland cement concrete mix in a mold having a smooth surface, curing the same, drying for 1 to 24 hours, and treating said surface with a solution of a fluosilicate selected from the class consisting of magnesium, cadmium and zinc.

6. Process of producing cast concrete having a glossy surface resistant to water spotting which comprises treating, with a magnesium fluosilicate solution, a cured dried concrete article having a smooth surface and cast from a deflocculated Portland cement mix.

7. A cast Portland cement object having an integral highly glossy surface treated with magnesium fluosilicate solution to render the surface resistant to disfiguration on contact with water.

8. A cast Portland cement object having an integral highly glossy surface treated with a solution of a fluosilicate selected from the class consisting of magnesium, cadmium and zinc to render the surface resistant to disfiguration on contact with water.

OSWALD H. GREAGER.
GORDON D. PATTERSON.